(12) United States Patent
Matsumoto

(10) Patent No.: US 9,128,453 B2
(45) Date of Patent: Sep. 8, 2015

(54) IMAGE FORMING APPARATUS, AND BILLING DESTINATION SETTING METHOD IN THE IMAGE FORMING APPARATUS

(75) Inventor: Yukinori Matsumoto, Amagasaki (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 364 days.

(21) Appl. No.: 13/119,922

(22) PCT Filed: Aug. 11, 2009

(86) PCT No.: PCT/JP2009/003852
§ 371 (c)(1),
(2), (4) Date: Mar. 18, 2011

(87) PCT Pub. No.: WO2010/032368
PCT Pub. Date: Mar. 25, 2010

(65) Prior Publication Data
US 2011/0176161 A1    Jul. 21, 2011

(30) Foreign Application Priority Data
Sep. 19, 2008  (JP) ................................. 2008-240939

(51) Int. Cl.
*G06K 15/00* (2006.01)
*G03G 21/02* (2006.01)
(Continued)

(52) U.S. Cl.
CPC ............ *G03G 21/02* (2013.01); *G03G 15/5016* (2013.01); *G03G 15/5091* (2013.01); *G06F 3/1203* (2013.01); *G06F 3/1204* (2013.01);
(Continued)

(58) Field of Classification Search
CPC ......................... G03G 15/5016; G06F 3/1204

USPC ............. 358/1.14, 1.16, 1.15; 705/34, 40, 52; 380/233; 455/406
See application file for complete search history.

(56) References Cited

U.S. PATENT DOCUMENTS

2002/0013677 A1 *  1/2002  Isshiki ......................... 702/186
2007/0166055 A1    7/2007  Yamauchi et al.
(Continued)

FOREIGN PATENT DOCUMENTS

EP    1 215 567    6/2002
EP    1 887 435    2/2008
(Continued)

OTHER PUBLICATIONS

International Search Report mailed Sep. 15, 2009, directed towards counterpart Application No. PCT/EP2009/003852; 3 pages.
(Continued)

*Primary Examiner* — Jacky X Zheng
(74) *Attorney, Agent, or Firm* — Buchanan Ingersoll & Rooney PC

(57) ABSTRACT

An image forming apparatus comprises: a controller storing therein a billing destination to which a fee for printing processing is charged, the controller operable to receive, from a user via an operation panel, an instruction for executing the printing processing while the user is logged in and to charge, to the billing destination, the fee for the execution of the printing processing; a card reader operable to receive a new billing destination while the user is logged in, without intervention of the operation panel, wherein when receiving the new billing destination, the controller updates the billing destination to the new billing destination by storing the new billing destination.

13 Claims, 12 Drawing Sheets

(51) Int. Cl.
  *G06F 3/12* (2006.01)
  *G06Q 20/14* (2012.01)
  *H04N 1/00* (2006.01)
  *G03G 15/00* (2006.01)

(52) U.S. Cl.
  CPC ............ *G06F 3/1273* (2013.01); *G06F 3/1285* (2013.01); *G06Q 20/14* (2013.01); *H04N 1/00222* (2013.01); *H04N 1/00411* (2013.01); *G03G 2215/00109* (2013.01); *H04N 2201/3205* (2013.01); *H04N 2201/3207* (2013.01)

(56) References Cited

U.S. PATENT DOCUMENTS

| | | | |
|---|---|---|---|
| 2008/0030750 A1* | 2/2008 | Kato | 358/1.4 |
| 2008/0313156 A1* | 12/2008 | Hirahara | 707/3 |
| 2009/0059287 A1* | 3/2009 | Yamada | 358/1.15 |

FOREIGN PATENT DOCUMENTS

| | | |
|---|---|---|
| JP | 2002-330253 | 11/2002 |
| JP | 2006-85477 | 3/2006 |
| JP | 2006-227703 | 8/2006 |
| JP | 2007-80209 | 3/2007 |
| JP | 2008-40809 | 2/2008 |

OTHER PUBLICATIONS

Extended European Search Report dated Oct. 9, 2013, directed to EP Application No. 09814214.4; 6 pages.

International Search Report mailed Sep. 15, 2009, directed towards counterpart Application No. PCT/JP2009/003852; 3 pages.

Notification of Reasons for Refusal dated Sep. 15, 2009 directed towards corresponding Japanese patent application No. 2008-240939; 9 pages.

* cited by examiner

| Fee by type and size (P yen/page) | | | | Correction factor (Q) by printing condition × Q | | |
|---|---|---|---|---|---|---|
| Sheet | | | OHP | | | |
| A4 or less | B4 | A3 | | Monochrome | Color | Aggregate |
| 10 | 20 | 30 | 50 | 1 | 2 | 0.95 |

| Billing destination ID | Name of billing destination |
|---|---|
| 2001 | Department A |
| 2002 | Department B |
| 2003 | Department C |
| .... | ......... |
| .... | ......... |
| .... | ......... |
| .... | ......... |

FIG. 6

| User ID | Billing destination ID | Name of billing destination |
|---|---|---|
| 1001 | 2001 | Department A |
| 1002 | 2002 | Department B |
| 1003 | 2003 | Department C |
| ........ | .... | .......... |
| ........ | .... | .......... |
| ........ | .... | .......... |
| ........ | .... | .......... |

FIG. 7

| Billing destination ID:2001 (Department A) | | |
|---|---|---|
| User ID | Usage time | Fee (Yen) |
| 1001 | August 1, 2008 9:15 AM | 30 |
| 1002 | August 1, 2008 9:25 AM | 20 |
| 1002 | August 1, 2008 9:36 AM | 110 |
| 1001 | August 1, 2008 9:57 AM | 40 |
| ........ | ..................... | .......... |
| ........ | ..................... | .......... |
| ........ | ..................... | .......... |

| User ID | Password |
|---------|----------|
| 1001 | absdfe |
| 1002 | dfghjrr |
| 1003 | skjiuyr |
| .... | ......... |
| .... | ......... |
| .... | ......... |
| .... | ......... |

| User ID | Change authority | ID of billing destination to which user can change | Name of billing destination |
|---------|------------------|-----------------------------------------------------|------------------------------|
| 1001 | W/O change authority | | |
| 1002 | W/ change authority | 2001 | A |
| 1003 | W/ change authority | 2001 | A |
| | | 2002 | B |
| ........ | .... | .... | ......... |
| ........ | .... | .... | ......... |
| ........ | .... | .... | ......... |

FIG. 17

| Billing destination ID | Name of billing destination | Restricted printing condition | Details of restriction |
|---|---|---|---|
| 2001 | A | No. of pages to be printed, FAX destination | 100 pages or less, Address book 1 |
| 2002 | B | Color printing, Operation panel display | N/A, Color printing instruction button is not displayed |
| 2003 | C | Printing sheet size | A4 |
| .... | | | |
| .... | | | |
| .... | | | |
| .... | | | |

IMAGE FORMING APPARATUS, AND BILLING DESTINATION SETTING METHOD IN THE IMAGE FORMING APPARATUS

REFERENCE TO RELATED APPLICATIONS

This application is a national stage application under 35 USC 371 of International Application No. PCT/JP2009/003852, filed Aug. 11, 2009, which claims the priority of Japanese Application No. 2008-240939, filed Sep. 19, 2008, the contents of which prior applications are incorporated herein by reference.

FIELD OF THE INVENTION

The present invention relates to a technique for managing a billing destination in an image forming apparatus that charges for execution of printing, and in particular to a technique for managing a change in the setting of the billing destination.

BACKGROUND OF THE INVENTION

In recent years, image forming apparatuses such as copiers that charge for execution of a printing job have been prevalent. One example of a technique for selecting and setting a billing destination in such an image forming apparatus is disclosed in Patent literature 1. In this technique, a setting of a billing destination is performed after a user logs in and selects the billing destination via a GUI (Graphic User Interface) displayed on an operation panel.

Such a technique enables a user to select and set a billing destination to which a fee for a printing job is charged.
[Patent Literature 1]
Japanese Patent Application Publication No. 2008-40809

SUMMARY OF THE INVENTION

However, an image forming apparatus as described above has the following problem. That is, in order for a user to select a billing destination, a selection screen for selecting the billing destination needs to be displayed on an operation panel of the image forming apparatus. Therefore, in the case of selecting and setting a different billing destination for each printing job, a screen displayed on the operation panel needs to be switched to the selection screen, every time the user performs operations for selecting a billing destination. This switching operation is time consuming.

The present invention has been achieved in view of the above problem, and an aim thereof is to provide an image forming apparatus in which a billing destination is easily changed, and a billing destination setting method used in the image forming apparatus.

In order to solve the above problem, one aspect of the present invention is an image forming apparatus comprising: a storage storing therein a billing destination to which a fee for printing processing is charged; an operation panel operable to receive, from a user, an instruction for executing the printing processing while the user is logged in; a billing part operable to charge, to the billing destination, the fee for the execution of the printing processing; a receiver operable to receive a new billing destination while the user is logged in; and an update part operable to update the billing destination to the new billing destination by storing the new billing destination into the storage, when the receiver receives the new billing destination.

Another aspect of the present invention is a billing destination setting method in an image forming apparatus comprising: a billing step of receiving an instruction for executing printing processing via an operation panel while the user is logged in, and of charging, to a billing destination stored in a storage, a fee for the execution of the printing processing; a receiving step of receiving a new billing destination via a receiver, without intervention of the operation panel, while the user is logged in; and an updating step of updating the billing destination to the new billing destination by storing the new billing destination in the storage, when the receiving step receives the new billing destination.

According to the stated structure of the present invention, a new billing destination is input via the receiver without use of the operation panel. This makes it easy for a user to change a billing destination via the receiver without operating the operation panel.

BRIEF DESCRIPTION OF THE DRAWINGS

FIG. 6 shows a specific example of default billing destination management information.

FIG. 7 shows a specific example of billing destination usage management information.

FIG. 17 shows a specific example of restriction information indicating functions restricted for each billing destination.

DETAILED DESCRIPTION OF THE INVENTION (1) Structure of Printing System 1

The following describes an embodiment of a printing system 1 according to the present invention.

Figure 1:
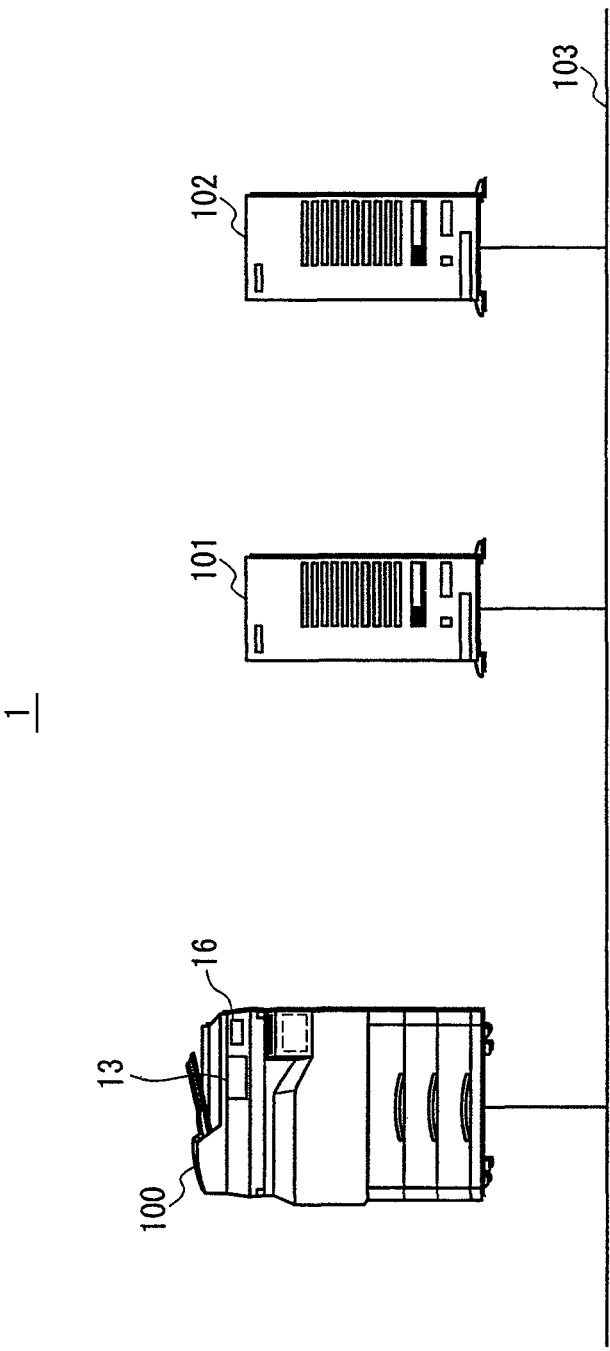
FIG. 1 shows an example of a structure of a printing system 1 according to the present embodiment.

FIG. 1 shows an example of a structure of the printing system 1 according to the present embodiment. As shown in FIG. 1, the printing system 1 includes an image forming apparatus 100, a billing server 101, and an authentication server 102. In FIG. 1, a reference sign 13 denotes an operation panel, and a reference sign 16 denotes a card reader. The operation panel and the card reader are described below.

The image forming apparatus 100, the billing server 101, and the authentication server 102 are connected to each other via a LAN (Local Area Network) 103.

(2) Structure of Image Forming Apparatus 100

Figures 2, 3:
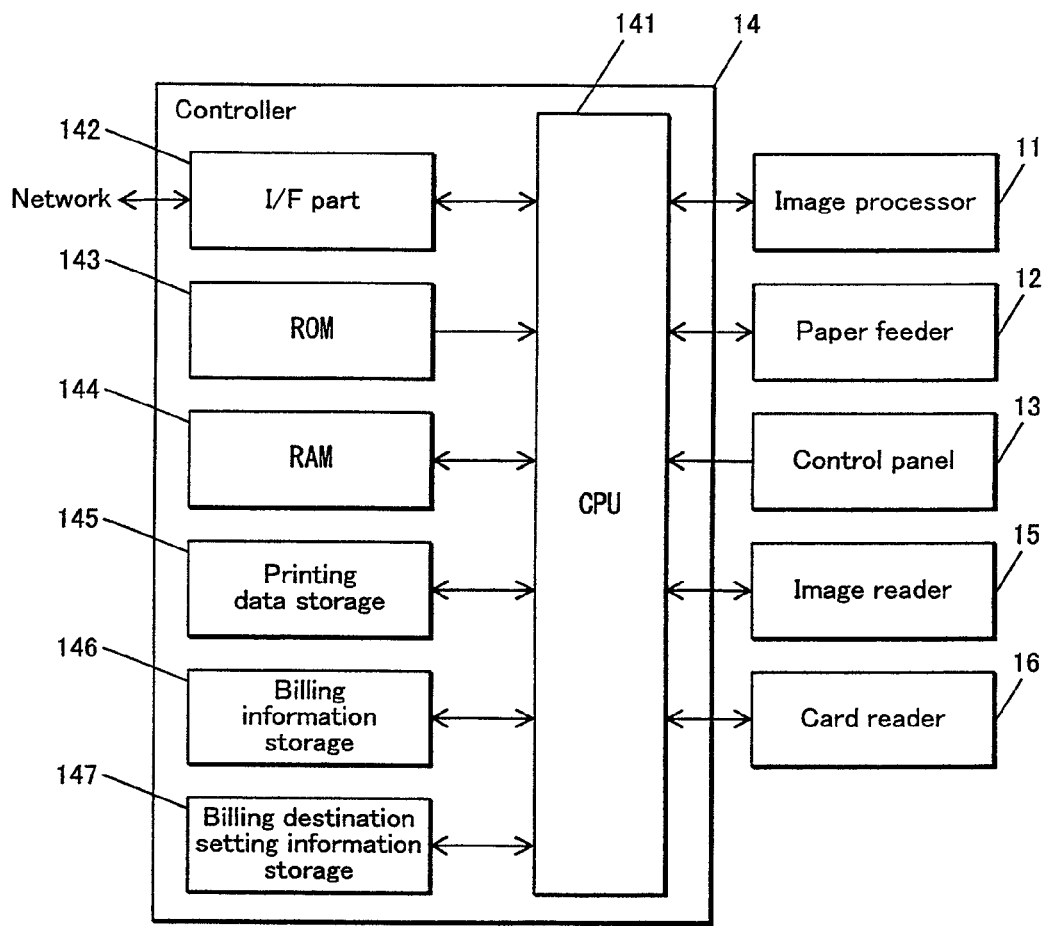
FIG. 2 is a block diagram showing a structure of an image forming apparatus 100.
FIG. 3 shows a specific example of billing information.

FIG. 2 is a block diagram showing a structure of the image forming apparatus 100. As shown in FIG. 2, the image forming apparatus 100 includes an image processor 11, a paper feeder 12, an operation panel 13, a controller 14, an image reader 15, and a card reader 16.

The image processor 11 performs printing processing. Specifically, the image processing 11 forms an image on a recording sheet fed by the paper feeder 12, based on image data input from the controller 14.

The operation panel 13 includes a plurality of input keys and a liquid crystal display. A touch panel is arranged on a surface of the liquid crystal display. Upon receiving an instruction from a user via the touch panel or the input keys, the operation panel 13 notifies the controller 14 of the instruction.

The image reader 15 includes an image input device such as a scanner. The image reader 15 generates image data by reading information on a recording sheet, such as characters and figures.

The card reader 16 reads identification information (here, it is assumed that the identification information is either the ID number of a user or the ID number of a billing destination), and outputs the identification information to the controller 14. The ID number of a user is recorded on a user identification card that is used to identify the user, and the ID number of a billing destination is recorded on a billing destination identification card that is used to identify the billing destination for a printing job.

Upon receiving identification information, the controller 14 determines whether the identification information is the user identification information or the billing destination identification information based on, for example, the first digit of a number indicated by the identification information (here, if the first digit is "1", the controller 14 determines that the identification information is the user identification information. If the first digit is "2", the controller 14 determines that the identification information is the billing destination identification information).

The card reader 16 may be, for example, an RFID (Radio Frequency Identification) reader or a magnetic card reader.

Here, the user identification information does not need to be read by the card reader 16 to be input to the controller 14. Instead, the user identification information may be input via the operation panel 13, and only the billing destination identification information may be read by the card reader 16.

The user identification card and the billing destination identification card may be IC chips or magnetic cards that are compatible with the card reader 16.

The controller 14 includes, as main components thereof, a CPU 141, a communication interface (I/F) part 142, a ROM 143, a RAM 144, a printing data storage 145, a billing information storage 146, and a billing destination setting information storage 147.

The I/F part 142 is an interface for connecting to a LAN, such as a LAN card or a LAN board.

The ROM 143 stores programs necessary for printing processing, programs for an operation control in billing destination switch control processing described below, and the like.

The RAM 144 is used as a work area when the CPU 141 is executing a program.

The printing data storage 145 stores image data for printing. The image data is input via the I/F part 142 and the image reader 15, converted into bitmap data by the CPU 141, and thereafter stored in the printing data storage 145.

The billing information storage 146 stores billing information acquired from the billing server 101.

Here, the billing information indicates the correspondence between printing conditions and fees. Based on a printing condition input via the operation panel 13 and the billing information, the CPU 141 calculates a fee for printing processing.

FIG. 3 shows a specific example of the billing information. As shown in FIG. 3, the billing information indicates the correspondence between (i) the type and size of a recording sheet and (ii) a fee (P yen) per recording sheet having the type and the size. Furthermore, the billing information defines a correction factor (Q) depending on whether a printing condition is monochrome printing, color printing, or aggregate printing. A fee per recording sheet is calculated by multiplying P and Q.

Suppose that printing conditions that are input are as follows: the type of a recording sheet is a paper sheet; the size thereof is A4; the printing method thereof is monochrome printing; and the number of pages to be printed is 10. In this case, P and Q corresponding to the printing conditions are 10 and 1, respectively, according to the billing information shown in FIG. 3. Therefore, a fee per recording sheet is 10 yen, which is calculated by multiplying P (i.e., 10) by Q (i.e., 1).

Since the number of pages to be printed is 10 pages, a fee for the printing job is 100 yen, which is calculated by multiplying 10 yen (fee per recording sheet) by 10 pages (number of pages to be printed).

The billing destination setting information storage 147 stores the ID number of a billing destination for printing processing. The ID number is set in billing destination switch control processing described below.

The CPU 141 reads necessary control programs from the ROM 143, controls the image processor 11, the paper feeder 12, and the image reader 15, so that the printing processing is smoothly performed. Also, the CPU 141 controls operations in billing destination switch control processing described below.

(3) Structure of Billing Server 101

Figures 4, 5:
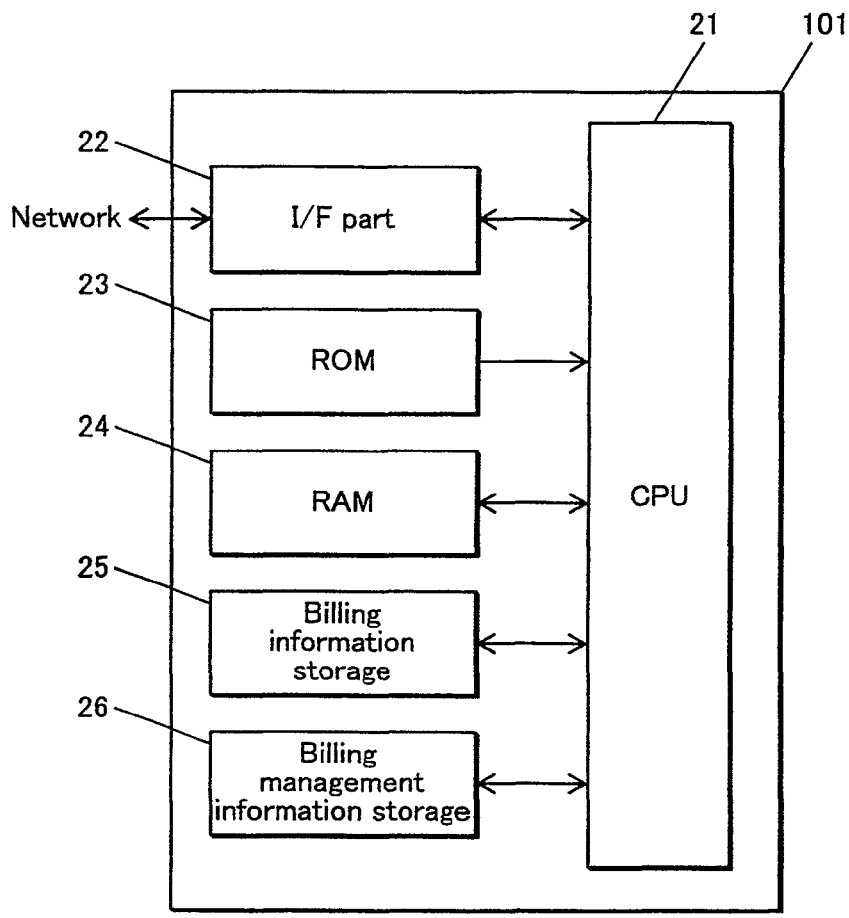
FIG. 4 is a block diagram showing a structure of a billing server 101.
FIG. 5 shows a specific example of billing destination identification information.

FIG. 4 is a block diagram showing a structure of the billing server 101. As shown in FIG. 4, the billing server 101 includes, as main components thereof, a CPU 21, a communication interface (I/F) part 22, a ROM 23, a RAM 24, a billing information storage 25, and a billing management information storage 26.

The I/F part 22 is an interface for connecting to a LAN, such as a LAN card or a LAN board.

The ROM 23 stores programs necessary for billing destination validation processing and billing destination management processing that are described below.

The RAM 24 is used as a work area when the CPU 21 is executing a program.

The billing information storage 25 stores billing information.

The billing management information storage 26 stores billing destination identification information, default billing destination management information, and billing destination usage management information.

Here, the billing destination identification information indicates the correspondence between the ID numbers of billing destinations and the names of the billing destinations. In the billing destination identification information, the ID numbers and the billing destinations are registered in advance in one-to-one correspondence by an administrator. Billing destination validation processing is performed by determining whether the ID number of a billing destination read by the card reader 16 is registered in the billing destination identification information.

FIG. 5 shows a specific example of the billing destination identification information.

The default billing destination management information indicates the correspondence between the ID numbers of users, the ID numbers of billing destinations predetermined for the users, and the names of the billing destinations. The default billing destination management information is used for the initial setting of a billing destination. The initial setting is performed when a user is authenticated in billing destination switch control processing described below. In this case, the ID number of a billing destination corresponding to the authenticated user is initially set in the default billing destination management information. Hereinafter, the ID number of a billing destination initially set in the aforementioned manner is referred to as "default billing destination".

FIG. 6 shows a specific example of the default billing destination management information.

The billing destination usage management information indicates, for each billing destination, the correspondence between (i) the ID number of a user who has used the image forming apparatus 100 for a printing job whose fee is charged to the billing destination, (ii) usage time indicated by login time, and (iii) the fee for the printing job.

FIG. 7 shows a specific example of the billing destination usage management information. FIG. 7 shows the billing destination usage management information regarding a billing destination whose ID number is 2001 (the name of the billing destination is a department A).

The CPU 21 reads, from the ROM 23, programs necessary for billing destination validation processing and billing destination management processing that are described below, and controls operations in the billing destination validation processing and the billing destination management processing.

(4) Structure of Authentication Server 102

Figures 8, 9:
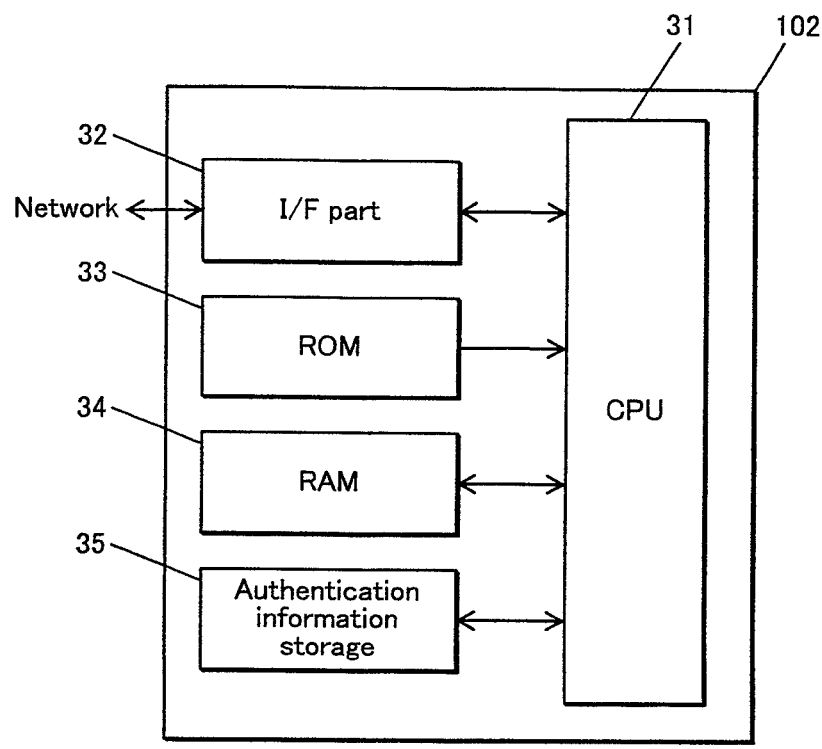
FIG. 8 is a block diagram showing a structure of an authentication server 102.
FIG. 9 shows a specific example of user authentication management information.

FIG. 8 is a block diagram showing a structure of the authentication server 102. The authentication server 102 includes, as main components thereof, a CPU 31, a communication interface (I/F) part 32, a ROM 33, a RAM 34, an authentication information storage 35.

The I/F part 32 is an interface for connecting to a LAN, such as a LAN card or a LAN board.

The ROM 33 stores programs necessary for processing for authenticating a user of the image forming apparatus 100. The processing is hereinafter referred to as "user authentication processing".

The RAM 34 is used as a work area when the CPU 31 is executing a program.

The authentication information storage 35 stores user authentication management information.

The user authentication management information indicates the correspondence between the ID numbers of users and passwords. The ID numbers of the users of the image forming apparatus 100 are registered in advance in the user authentication management information, where each ID number is unique to a different one of the users. User authentication is performed by judging whether the ID number of a user and a password are registered in the user authentication management information. The ID number of the user is read by the card reader 16 from the user identification card of the user, and the password is input via the operation panel 13.

FIG. 9 shows a specific example of the user authentication management information.

The CPU 31 reads, from the ROM 33, programs necessary for user authentication processing described below.

Specifically, the user authentication processing is performed as follows.

In billing destination switch control processing described below, the image forming apparatus 100 requests the authentication server 102 to authenticate a user. Upon receiving the request, the authentication server 102 obtains user authentication information from the image forming apparatus 100. The user authentication information indicates the ID number of the user and a password. The authentication server 102 then judges whether the user authentication information is registered in the user authentication management information. When judging that the user authentication information is registered therein, the authentication server 102 notifies the image forming apparatus 100 that the user has been authenticated. When judging that the user authentication information is not registered therein, the authentication server 102 notifies the image forming apparatus 100 that the user has not been authenticated.

<Operations>

Figure 10:
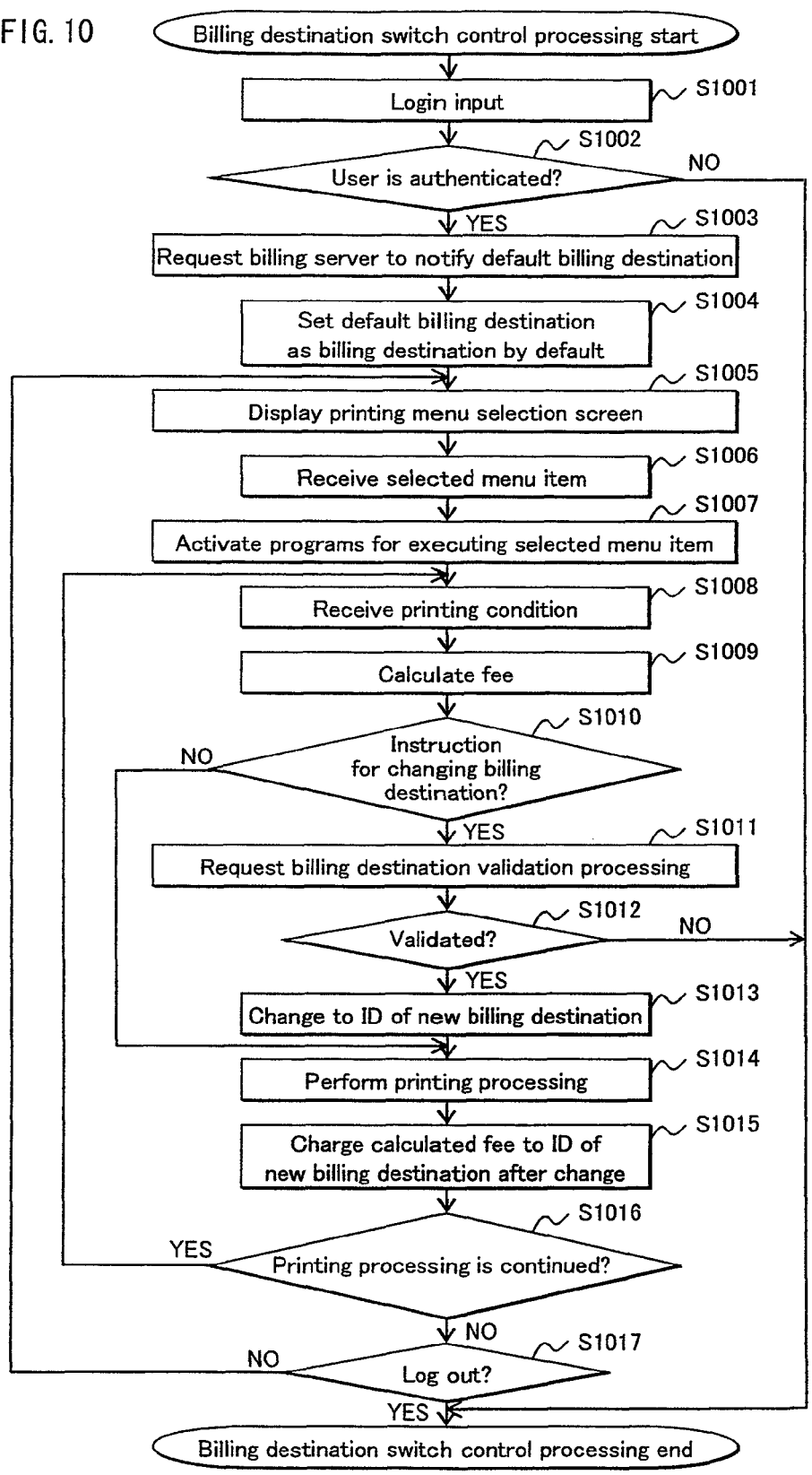
FIG. 10 is a flowchart showing billing destination switch control processing performed by a controller 14.

The following describes billing destination switch control processing performed by the controller 14, with reference to FIG. 10.

The controller 14 receives the ID number of a user and a password. The ID number is input from the card reader 16 reading the ID number from a user identification card. The password is input by the user via a password input screen displayed on the operation panel 13 at the time of login. Hereinafter, the inputs of the ID number and the password are collectively referred to as "login input". Upon receipt of the login input (step S1001), the controller 14 acquires login input time, notifies the authentication server 102, via the I/F part 142, of user authentication information indicating the ID number of the user and the password, and requests the authentication server 102 to authenticate the user.

When the authentication server 102 has authenticated the user by validating that the notified user authentication information is registered in the user authentication management information (step S1002: YES), the controller 14 notifies the billing server 101 of the ID number of the user via the I/F part 142, and requests the billing server 101 to notify the default billing destination of the user (step S1003). Subsequently, the controller 14 stores, into the billing destination setting information storage 147, the default billing destination information that has been notified by the billing server 101 upon request, and sets the default billing destination information as the billing destination of the printing processing by default (step S1004). Subsequently, the controller 14 causes the liquid crystal display on the operation panel 13 to display a printing menu selection screen (step S1005).

The printing menu selection screen shows buttons for selecting an item from among printing menu items, such as normal printing processing, aggregate printing processing, pull-printing processing, and the like.

Meanwhile, when notified by the authentication server 102 that the user has not been authenticated (step S1002: NO), or when notified, by the billing server 101 in response to the request in step S1003, that the default destination has not been validated in billing destination validation processing described below, the controller 14 ends billing destination switch control processing.

Upon receiving a printing menu item selected by a user via the printing menu selection screen (step S1006), the controller 14 activates programs for executing the selected printing menu item (step S1007). Subsequently, the controller 14 causes the liquid crystal display of the operation panel 13 to display a condition setting screen for setting a printing condition for the selected printing menu item, and receives a printing condition from a user via the condition setting screen (step S1008). The controller 14 then calculates a fee based on the billing information stored in the billing information storage 146 and the printing condition that has been input (step S1009). The controller 14 monitors, until an instruction for executing printing processing corresponding to the selected printing menu item is input via the operation panel 13, whether the ID number of a billing destination is input as the billing destination identification information via the card reader 16, thereby judging whether an instruction for changing a billing destination has been given (step S1010).

When the instruction for changing the billing destination has been given by the ID number of a billing destination being input as the billing destination identification information (step S1010: YES), the controller 14 notifies the billing server 101 via the I/F part 142 of the ID number of the billing destination that has been input, and requests the billing server 101 to perform the validation processing for the billing destination (step S1011). When the billing destination has been validated by the billing server 101 (step S1012: YES), the controller 14 stores, into the billing destination setting information storage 147, the ID number of the billing destination input from the card reader 16 instead of the ID number of the default billing destination, and changes the billing destination setting from the ID number of the default billing destination to the ID number of the billing destination (step S1013).

Upon receiving the instruction for executing the printing processing, the controller 14 causes the printing processing to be performed (step S1014), notifies the billing server 101 of (i) the calculated fee, (ii) the ID number of the billing destination stored in the billing destination setting information storage 147, (iii) the ID number of the user, and (iv) the login time, and charges the fee to the ID number of the notified billing destination (step S1015).

Then, the controller 14 causes the liquid crystal display of the operation panel 13 to display a message inquiring whether to continue the printing processing corresponding to the selected printing menu item. Upon receiving an instruction for ending the printing processing from the user via the operation panel 13 (step S1016: NO), the controller 14 further causes the liquid crystal display of the operation panel 13 to display a message inquiring whether the user desires to log out. Upon receiving an instruction for logging out from the user via the operation panel 13 (step S1017: YES), the controller 14 ends the billing destination switch control processing.

Upon receiving an instruction for continuing the printing processing from the user via the operation panel 13 (step S1016: YES), the controller 14 performs the processing of step S1008. Upon receiving an instruction for not logging out from the user via the operation panel 13 (step S1017: NO), the controller 14 performs the processing of step S1005.

The following describes billing destination validation processing performed by the billing server 101.

Figure 11:
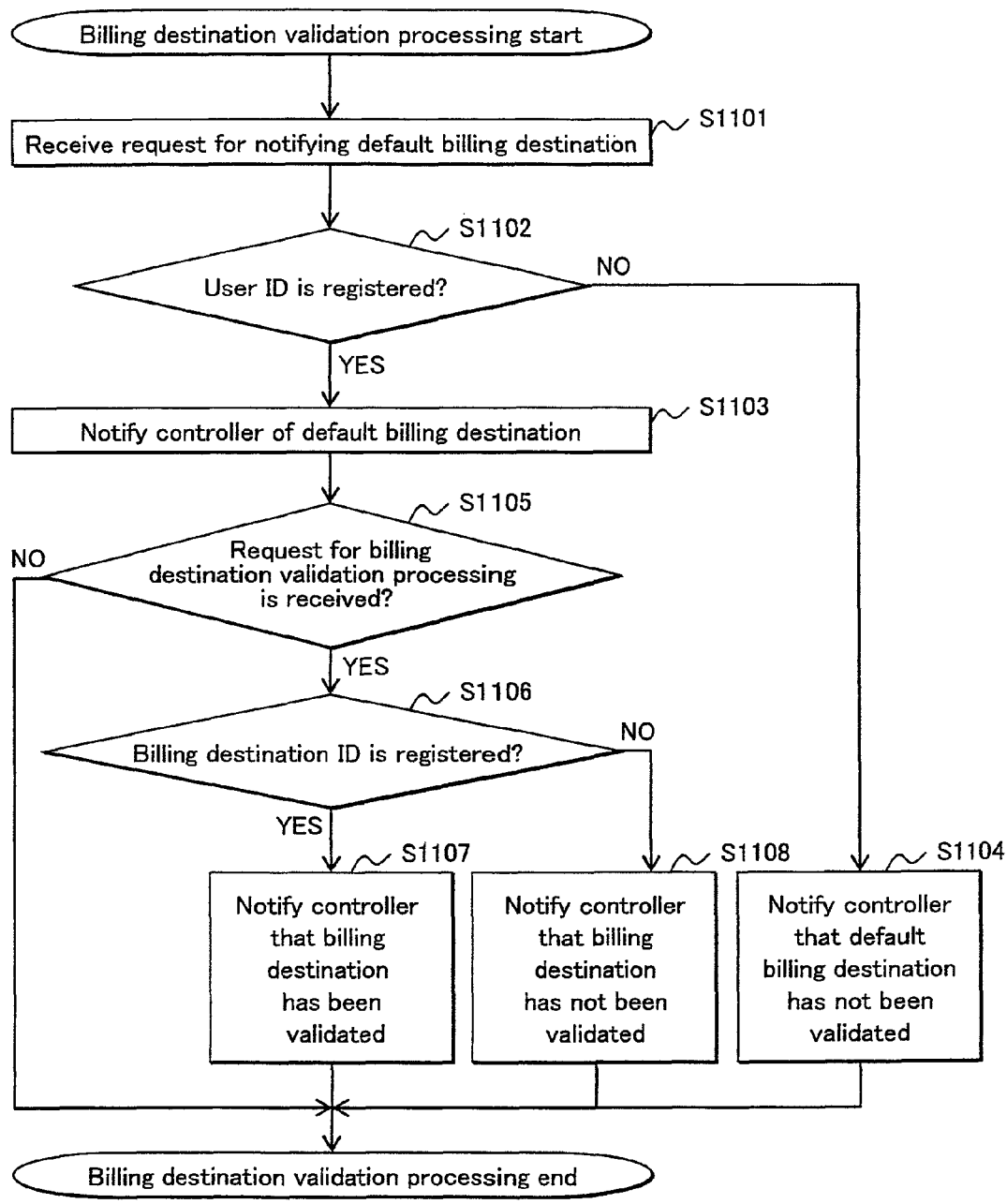
FIG. 11 is a flowchart showing billing destination validation processing performed by the billing server 101.

FIG. 11 is a flowchart of the billing destination validation processing.

Upon receiving a request for notifying the default billing destination from the controller 14 in step S1003 shown in FIG. 10 (step S1101), the billing server 101 refers to the default billing destination management information stored in the billing management information storage 26, and judges whether the ID number of the user notified at the time of the request is registered in the default billing destination management information (step S1102). If the ID number is registered therein (step S1102: YES), the billing server 101 notifies the controller 14 of the ID number of a billing destination corresponding to the ID number of the user, as a default billing destination (step S1103).

If the ID number is not registered therein (step S1102: NO), the billing server 101 notifies the controller 14 that a corresponding default billing destination has not been validated (step S1104).

Furthermore, upon receiving a request for the billing destination validation processing from the controller 14 in step S1011 shown in FIG. 10 (step S1105: YES), the billing server 101 refers to the billing destination identification information stored in the billing management information storage 26, and judges whether the ID number of a billing destination notified at the time of the request is registered in the billing destination identification information (step S1106). If the ID number is registered therein (step S1106: YES), the billing server 101 notifies the controller 14 that the billing destination specified by the ID number has been validated (step S1107).

If the ID number is not registered therein (step S1106: NO), the billing server 101 notifies the controller 14 that the billing destination has not been validated (step S1108).

Figures 12, 13:
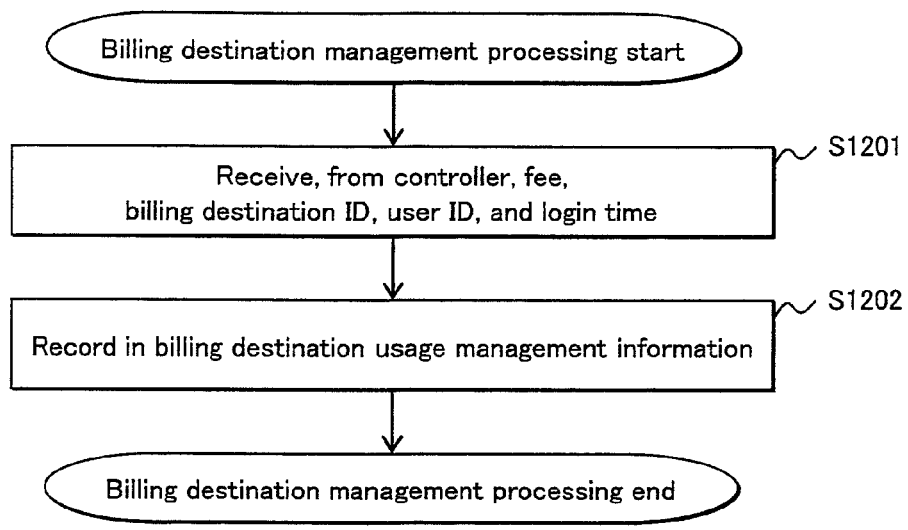
FIG. 12 is a flowchart showing billing destination management processing performed by the billing server 101.
FIG. 13 shows a specific example of change authority management information.

The following describes billing destination management processing performed by the billing server 101. FIG. 12 is a flowchart of the billing destination management processing.

Upon receiving the notification from the controller 14 in step S1015 shown in FIG. 10 (step S1201), the billing server 101 records, in the field of the notified billing destination in the billing destination usage management information stored in the billing management information storage 26, the following information pieces in association with each other: the ID number of the user; the login time; the ID number of the billing destination; and the fee that have been notified (step S1202).

<Modification>

Although an image forming apparatus according to the present invention has been described based on the aforementioned embodiment, the present invention is of course not limited to the embodiment.

(1) In the present embodiment, an instruction for changing a billing destination is input by the card reader 16 reading the billing destination identification card. However, it is not limited to such. For example, it is possible to provide a sub-operation panel different from the operation panel 13. Then, a billing destination input screen may be displayed on the sub-operation panel continuously while a user is logged in, and the user may change a billing destination via the billing destination input screen displayed on the sub-operation panel. In this case, it is preferable to provide the sub-operation panel close to the operation panel 13 so as to facilitate an input operation.

(2) In the billing destination switch control processing in the present embodiment, the billing destination validation processing is performed to judge whether a default billing destination is permitted to be changed. However, it is possible to further judge whether a user attempting to change the default billing destination has change authority, thereby judging whether the default billing destination is permitted to be changed.

Specifically, in the flowchart of FIG. 10 showing the billing destination switch control processing, judgment of whether an authenticated user has change authority for changing a default billing destination may be performed after the processing step of judging and validating a new billing destination in step S1012. Then, the default billing destination may be changed to the new billing destination when the new billing destination is validated (step S1012: YES) and the authenticated user has the change authority.

Judgment of whether an authenticated user has the change authority may be performed, for example, by reference to change authority management information as shown in FIG. 13. The change authority management information is stored in one of the image forming apparatus 100, the billing server 101, and the authentication server 102, and indicates the correspondence between (i) the ID number of a user, (ii) information indicating whether the user has the change authority, (iii) the ID number of a new billing destination to which the user can change, and (iv) the name of the new billing destination.

Figure 14:
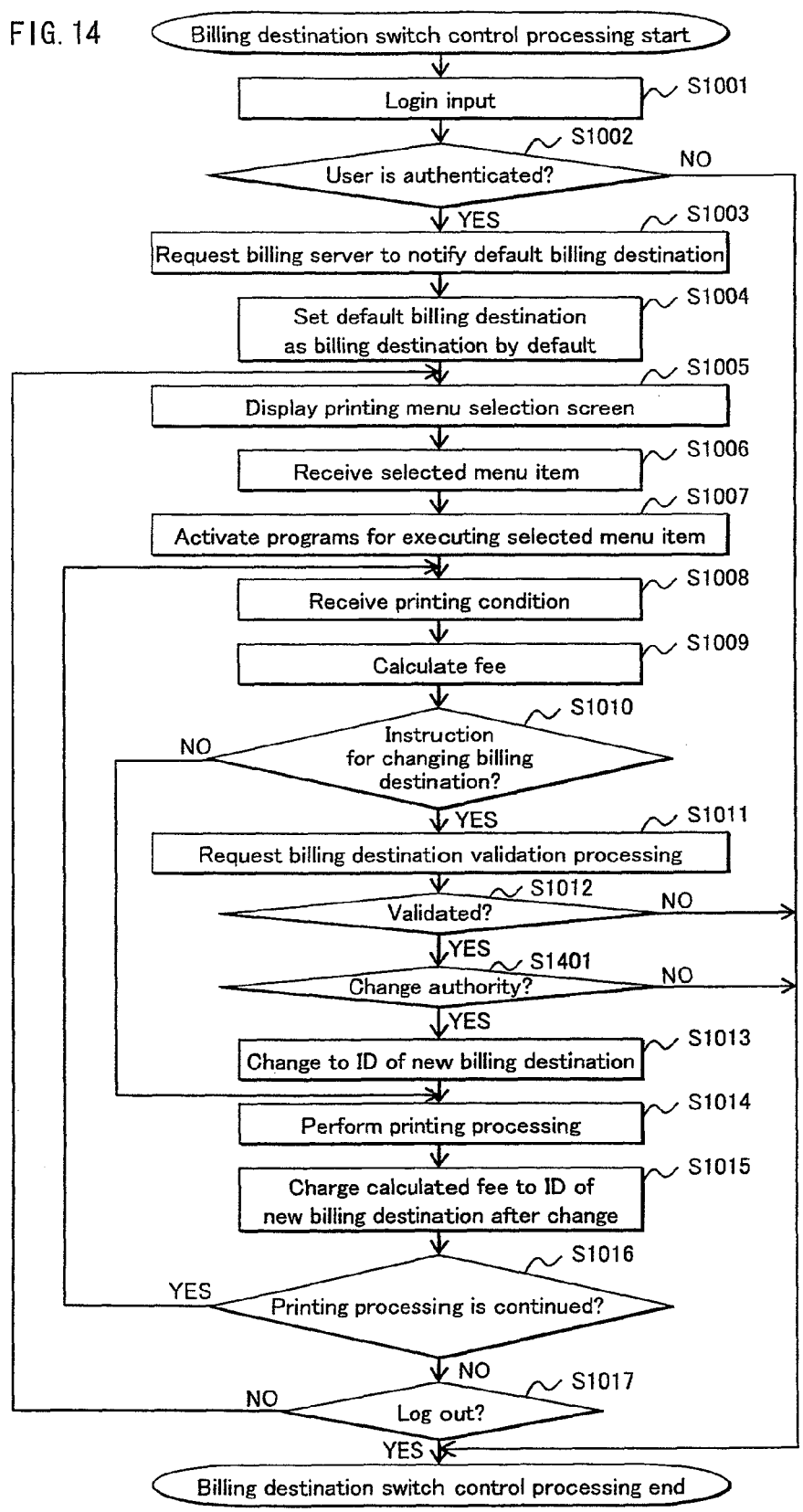
FIG. 14 is a flowchart showing a modification of the billing destination switch control processing.

FIG. 14 is a flowchart showing a modification of the billing destination switch control processing, where a step of judging whether an authenticated user has the change authority (step S1401) is additionally performed after the processing step of judging and validating a new billing destination in step S1012 shown in FIG. 10. In FIG. 14, the same step numbers are provided for the same processing steps shown in the flowchart of FIG. 10.

In the judgment of step S1401, the change authority management information may be stored in the image forming apparatus 100 itself. Alternatively, the change authority management information may be stored in either the billing server 101 or the authentication server 102, and the image forming apparatus 100 may acquire the change authority management information from either of the servers 101 and 102 that has the change authority management information so as to perform the judgment of step S1401. Furthermore, the image forming apparatus 100 may request either of the authentication server 102 and the billing server 101 to perform the judgment of step S1401, and receive a result of the judgment from either of the servers 101 and 102 that has performed the judgment.

(3) When a default billing destination is changed to a new billing destination in the billing destination switch control processing of the present embodiment, the new billing destination cannot be changed back to the default billing destination without the user logging out, unless the billing destination identification information indicating the default billing destination is obtained by the card reader 16 reading the billing destination identification card. However, it is not limited to such. For example, after a default billing destination is changed to a new billing destination, the image forming apparatus may receive an instruction for changing the new billing destination back to the default billing destination via the card reader 16. Upon receiving the instruction, the image forming apparatus may reset the billing destination to the default billing destination.

Specifically, the image forming apparatus 100 may store in advance an ID number (e.g., a number whose digits are all nine) corresponding to an instruction for changing a billing destination back to a default billing destination. Here, the ID number is hereinafter referred to as "default setting instruction ID number", and the instruction as "default setting instruction". The image forming apparatus 100 may reset the billing destination to the default billing destination, when the card reader 16 reads, from a identification card, the ID number whose digits are all nine, and inputs the read ID number to the image forming apparatus 100.

Figure 15:
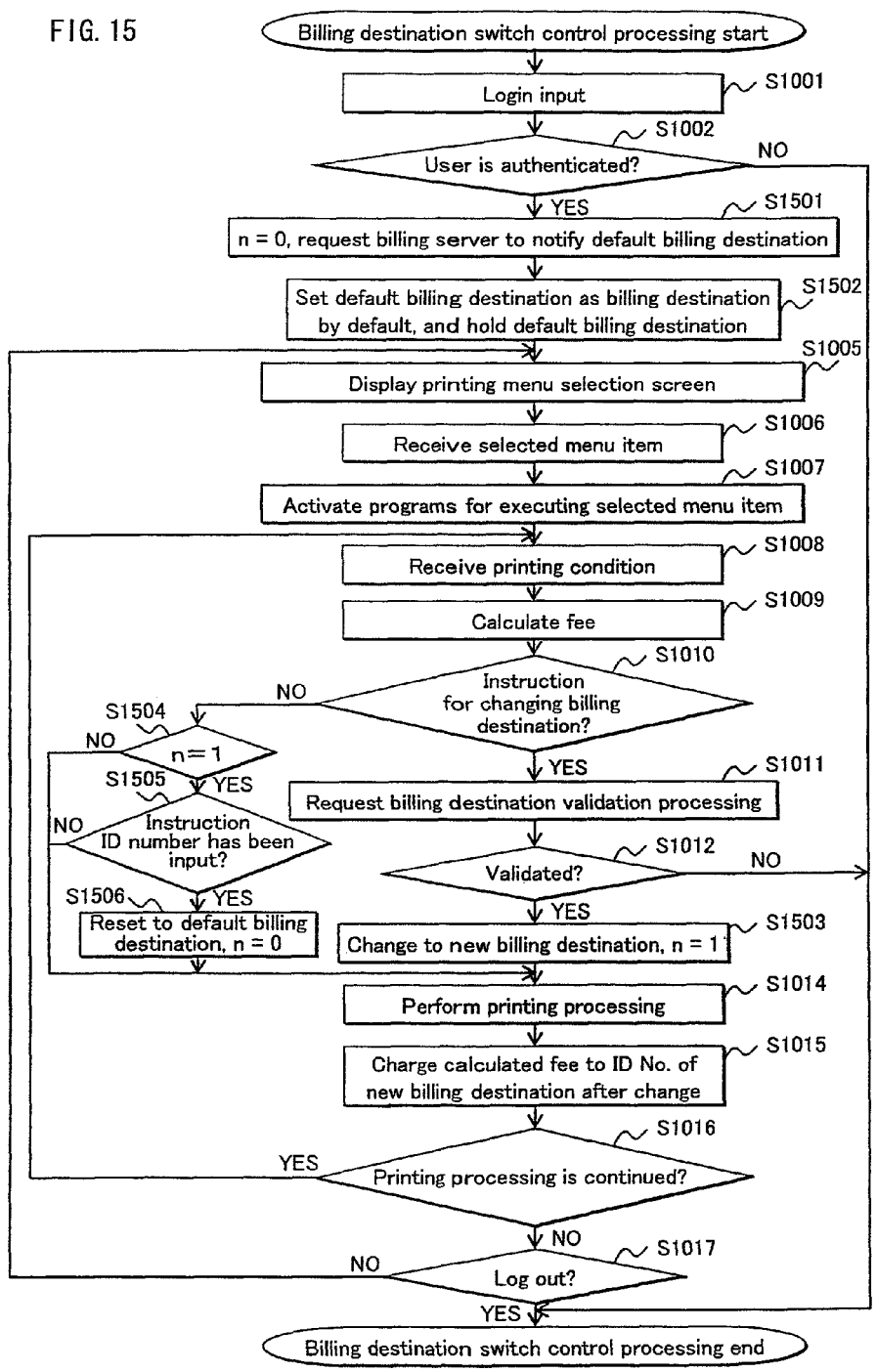
FIG. 15 is a flowchart showing a modification of the billing destination switch control processing.

FIG. 15 is a flowchart showing a modification of the billing destination switch control processing, where a billing destination is resettable to a default billing destination. In FIG. 15, the same step numbers are provided for the same processing steps shown in the flowchart of FIG. 10.

The following describes differences from the flowchart of FIG. 10.

After steps S1001 and S1002, the controller 14 sets a flag value n to an initial value "0" and performs the same processing step as step S1003 in FIG. 10. Here, the flag value n indicates whether a billing destination is set to a default billing destination. When the flag value n is "0", it indicates that the billing destination is set to the default billing destination. When the flag value n is not "0", it indicates that the billing destination is not set to the default billing destination. In step S1502, the controller 14 stores the default billing destination notified by the billing server 101 into the billing destination setting information storage 147, and initially sets the default billing destination as a billing destination for printing processing in the same manner as the processing of step S1004 in FIG. 10, and holds the default billing destination.

Upon receiving an instruction for changing a billing destination in step S1010 (step S1010: YES), the controller 14 performs the processing of steps S1011 and S1012. In step S1503, the controller 14 changes the billing destination in the same manner as step S1013, and sets the flag value n to "1" indicating that the billing destination has been changed.

When the printing processing is continued (step S1016: YES) and an instruction for changing a billing destination is not given (step S1010: NO), the controller 14 judges whether the billing destination has been changed from the default, based on whether the flag value n indicates "1" (step S1504). When judging that the billing destination has been changed (step S1504: YES), the controller 14 judges whether a default setting instruction is given by monitoring whether a default setting instruction ID number has been input from the card reader 16 (step S1505). When judging that the default setting instruction is given and the default setting instruction ID number has been input (step S1505: YES), the controller 14 (i) updates the ID number of the billing destination after the change, which is stored in the billing destination setting information storage 147, to the default billing destination held in step S1502, (ii) resets the billing destination to the default billing destination, and (iii) sets the flag value n to "0" (step S1506).

(4) In the billing destination switch control processing in the present embodiment, when a user has been authenticated, a billing destination is initially set to a default billing destination corresponding to the ID number of the user. However, a billing destination may be initially set by receiving an ID number of the billing destination from the card reader 16, in the same manner as the case of changing a billing destination.

(5) In the present embodiment, the processing for changing a billing destination is performed when necessary. However, it is not limited to such. The following structure is applicable in a printing method, such as pull-printing, where an image forming apparatus performs printing processing by downloading a plurality of printing target files from an external server. In this structure, a billing destination for printing processing may be set for each downloaded printing target file, so that when printing processing is performed with respect to a printing target file, a fee for the printing processing is charged to a billing destination corresponding to the printing target file.

Figure 16:
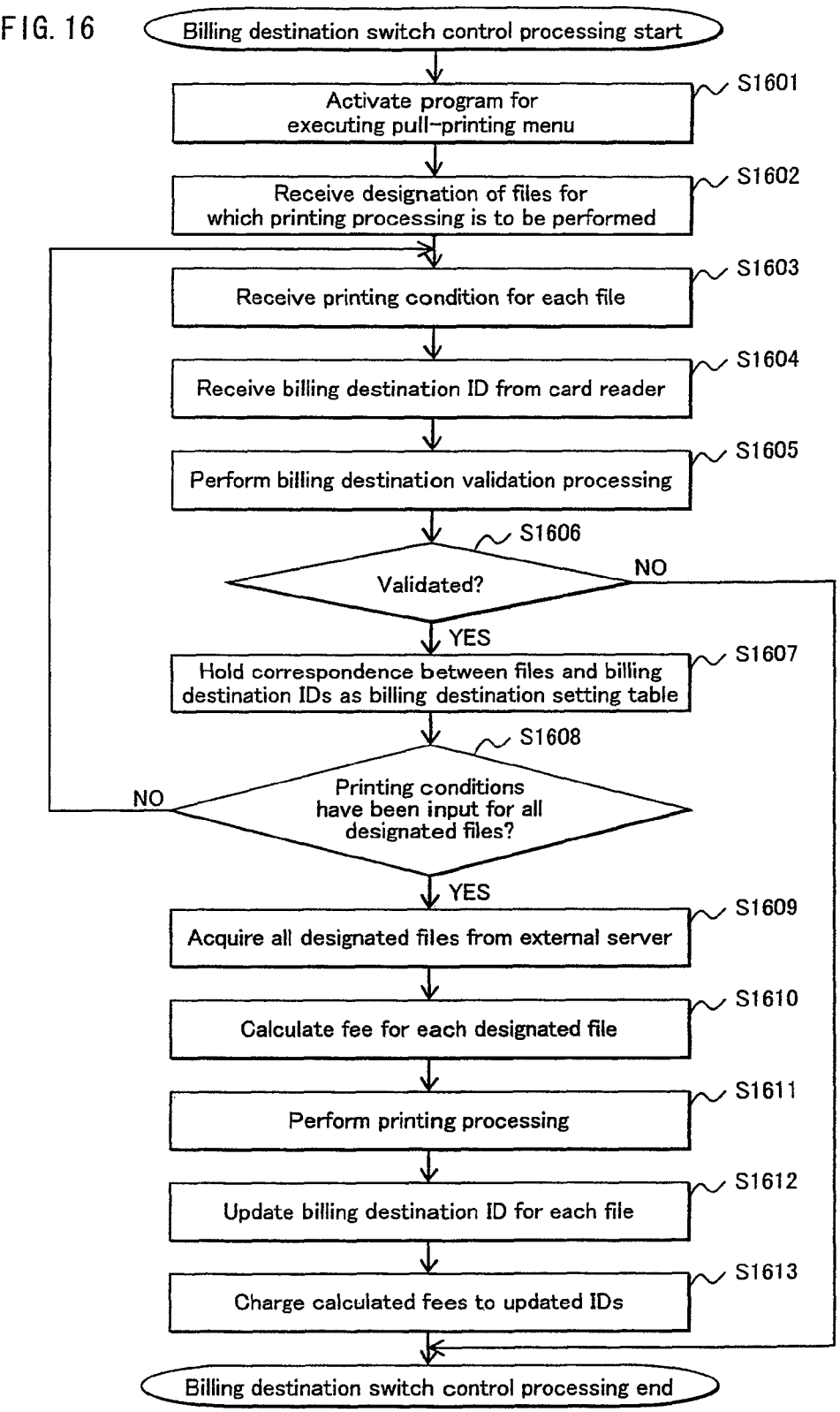
FIG. 16 is a flowchart showing a modification of the billing destination switch control processing in the case of pull-printing.

FIG. 16 is a flowchart showing a modification of the billing destination switch control processing in the case of a pull-printing method.

FIG. 16 shows processing after the processing of steps S1001 to S1005 in FIG. 10 is performed and a "pull-printing menu" is selected in step S1006.

The controller 14 activates a program for executing the selected pull-printing menu (step S1601). Then, the controller 14 acquires a list of printing target files from an external server that stores the printing target files, causes the liquid crystal display of the operation panel 13 to display the list, and receives the designation of files for which printing processing is to be performed (step S1602). Upon receiving a printing condition for each of the designated files (step S1603), the controller 14 causes the liquid crystal display of the operation panel 13 to display a message encouraging an input of billing destinations. Upon receiving, from the card reader 16, the ID numbers of the billing destinations as the billing destination identification information (step S1604), the controller 14 notifies the billing server 101 of the ID numbers via the I/F part 142 and requests the billing server 101 to perform processing for validating the billing destinations (step S1605). When the billing server 101 has validated the billing destinations (step S1606: YES), the controller 14 holds the correspondence between the printing target files and the ID numbers of the billing destinations as a billing destination setting table (step S1607), and judges whether printing conditions have been input for all the designated printing target files (step S1608).

When the input of the printing conditions has been completed (step S1608: YES), the controller 14 acquires all the designated printing target files from an external server (step S1609). Then, the controller 14 calculates, for each of the acquired printing target files, a fee based on the billing information stored in the billing information storage 146 and the printing condition of the printing target file (step S1610), and causes printing processing to be performed (step S1611). Subsequently, the controller 14 specifies the ID number of a billing destination for each of the designated printing target files, by referring to the billing destination setting table that has been held, and updates the ID numbers of billing destinations stored in the billing destination setting information storage 147 to the ID numbers of the specified billing destinations (step S1612). Finally, the controller 14 notifies the billing server 101 of the updated ID numbers of the billing destinations and the fees for the updated ID numbers, and causes the billing server 101 to charge the fees to the notified ID numbers of the billing destinations (step S1613).

(6) In the billing destination switch control processing in the present embodiment, an instruction for changing a billing destination is received after a fee is calculated. However, the instruction may be received any time as desired after the billing destination switch control processing is started.

The same applies to the modifications (1) to (3).

Also, instructions for changing billing destinations may be input before printing conditions are input. Then, printing conditions permitted to be input may be restricted for each of new billing destinations after the change.

Specifically, the billing server 101 may store in advance restriction information as shown in FIG. 17. The restriction information indicates the correspondence between (i) the ID number of a billing destination, (ii) the name of the billing destination, (iii) a restricted printing condition, and (iv) details of the restriction. The printing conditions permitted to be input for a new billing destination after change may be restricted in accordance with a restriction corresponding to the new billing destination.

(7) In the present embodiment, the user authentication processing is performed by the authentication server 102, and the billing destination validation processing is performed by the billing server 103. However, the user authentication processing and the billing destination validation processing may both be performed by the image forming apparatus 100. Specifically, the image forming apparatus 100 may acquire the user authentication management information from the authentication server 102, and the billing destination identification information from the billing server 101, and perform processing similar to the processing performed by both of the servers 101 and 102.

Also, the user authentication management information and the billing destination identification information may be stored in the image forming apparatus 100.

(8) According to the present embodiment, in the billing destination validation processing, the billing destination identification information is input to the image forming apparatus 100 via the billing destination identification card that is a recording medium storing therein the billing destination identification information. However, the billing destination identification information may be encoded in another input medium, such as a barcode or a QR (Quick Response) code. Then, the billing destination identification information in the form of the barcode or the QR code may be read by a barcode reader/a QR code reader.

(9) In the present embodiment, processing for validating a new billing destination is performed before a billing destination is changed. However, it is not limited to such. For example, when a user inputs an instruction for changing a billing destination, the controller 14 may require the user to further input, via the operation panel 13, the password of a new billing destination to which the user desires to change. Then, as with the user authentication processing, authentication processing of the new billing destination may be performed by judging whether the ID number of the new billing destination and the password correspond to those pre-registered in the billing server 101. When the new billing destination is authenticated in the authentication processing, the billing destination may be changed to the new billing destination.

<Conclusion>

The aforementioned embodiments and modifications solve the problem of prior art described above. With the structures described above, a new billing destination is input without use of the operation panel. This makes it easy for a user to change a billing destination without operating the operation panel.

Here, the new billing destination may be recorded on a recording medium, and the receiver may be a reader for reading the new billing destination from the recording medium.

With the stated structure, a new billing destination is input by the reader reading the new billing destination recorded on the recording medium. This reduces a risk of input errors unlike the case of manual input, thus promptly and reliably changing a billing destination.

The image forming apparatus may further comprise: a management information storage storing therein management information indicating one or more registered billing destinations; and a judgment part operable to judge whether the new billing destination is indicated in the management information when the receiver receives the new billing destination, wherein the update part may update the billing destination if the new billing destination is indicated in the management information.

With the stated structure, the billing destination is changed to the new billing destination after it has been validated that the new billing destination is registered. This effectively prevents a user from fraudulently changing the billing destination to a randomly selected billing destination.

Here, the management information storage may further store therein authority information indicating a user who has authority for changing the billing destination, the judgment part may further judge whether the user who is logged in has the authority based on the authority information, and the update part may update the billing destination only when the user has the authority.

With the stated structure, the billing destination is changed only when the logged-in user has the change authority. This effectively prevents a user not having the change authority to intentionally change the billing destination for a fraudulent purpose, thus improving security in changing the billing destination.

Here, the image forming apparatus may further comprise: a default setting part operable to store a predetermined billing destination into the storage when the user logs in; a holding part holding the predetermined billing destination; a recovery instruction storage storing therein a recovery instruction for updating the billing destination to the predetermined billing destination, wherein the receiver may receive the recovery instruction from the user while the user is logged in, and when the receiver receives the recovery instruction after the billing destination is updated, the update part may update the new billing destination in the storage to the predetermined billing destination.

With the stated structure, even in a case where the billing information is changed in the image forming apparatus in which the predetermined billing destination is set when the user logs in, the new billing destination after change may be easily changed back to the predetermined billing destination without newly logging in by inputting the recovery instruction.

Here, the image forming apparatus may further comprise: a designation receiver operable to receive designation of a plurality of printing target files that are to be acquired from an external device, wherein the receiver may receive a new billing destination for each of the printing target files, and the update part may update, for each printing target file, the billing destination to one of the new billing destinations corresponding to the printing target file.

This makes it easy to perform switching between billing destinations for each of the designated printing target files.

The present invention relates to a billing management technique in an image forming apparatus for charging for execution of printing, and in particular is available as a technique for managing a change in the setting of a billing destination.

REFERENCE SIGNS LIST 1 printing system
11 image processor
12 paper feeder
13 operation panel
14 controller
15 image reader
16 card reader
21, 31, 141 CPU
22, 32, 142 I/F part
23, 33, 143 ROM
24, 34, 144 RAM
145 printing data storage
25, 146 billing information storage
26 billing management information storage
35 authentication information storage
147 billing destination setting information storage

The invention claimed is:

1. An image forming apparatus comprising:
an operation panel configured to receive an instruction for executing print processing from a logged-in user logged in during a first login session;
a storage storing therein a first billing destination to which a fee for execution of the print processing is charged;
a print processing execution part configured to execute the print processing corresponding to the instruction;
a receiver configured to read a second billing destination stored in a recording medium and thereby receive an input of the second billing destination from the logged-in user logged in during the first login session;
a memory updater configured to, when the receiver receives the input of the second billing destination, perform update processing of updating the first billing destination to the second billing destination by storing the second billing destination into the storage; and
a billing part configured to charge, to the second billing destination stored in the storage, the fee for the print processing.

2. The image forming apparatus of claim 1 further comprising:
a management information storage storing therein management information indicating one or more registered billing destinations; and
a judgment part operable to judge whether the second billing destination is indicated in the management information when the receiver receives the input of the second billing destination, wherein
the memory updater updates the first billing destination if the second billing destination is indicated in the management information.

3. The image forming apparatus of claim 2, wherein
the management information storage further stores therein authority information indicating a user who has authority for changing the first billing destination,
the judgment part further judges whether the user who is logged in has the authority based on the authority information, and
the memory updater updates the first billing destination only when the user has the authority.

4. The image forming apparatus of claim 1 further comprising:
a default setting part operable to store a predetermined billing destination into the storage when the user logs in;
a holding part holding the predetermined billing destination;
a recovery instruction storage storing therein a recovery instruction for updating the first billing destination to the predetermined billing destination, wherein
the receiver receives the recovery instruction from the user while the user is logged in, and
when the receiver receives the recovery instruction after the first billing destination is updated, the memory updater updates the second billing destination in the storage to the predetermined billing destination.

5. The image forming apparatus of claim 1 further comprising:
a designation receiver operable to receive designation of a plurality of printing target files that are to be acquired from an external device, wherein
the receiver receives a second billing destination for each of the printing target files, and
the memory updater updates, for each printing target file, the first billing destination to one of the second billing destinations corresponding to the printing target file.

6. The image forming apparatus of claim 1,
wherein the operation panel is configured to receive printing conditions for executing the print processing, and
wherein the receiver is configured to receive the second billing destination while the user is logged in and at a time after receiving the printing conditions and before receiving the instruction for executing print processing.

7. A billing destination setting method in an image forming apparatus comprising:
a billing step of receiving an instruction for executing print processing from a logged-in user logged in during a first login session via an operation panel, and of charging, to a first billing destination stored in a storage, a fee for the print processing;
a receiving step of receiving a second billing destination from the logged-in user via a receiver, without intervention of the operation panel, while the user is logged in during the first login session; and
an updating step of, when the receiving step receives the input of the second billing destination, performing update processing of updating the first billing destination to the second billing destination by storing the second billing destination into the storage.

8. The billing destination setting method of claim 7 further comprising:
a management information storing step of storing management information indicating one or more registered billing destinations; and
a judging step of judging whether the second billing destination is indicated in the management information when the receiving step receives the input of the second billing destination, wherein
the updating step updates the first billing destination if the second billing destination is indicated in the management information.

9. The billing destination setting method of claim 8, wherein
the management information storing step further stores authority information indicating a user who has authority for changing the first billing destination,
the judging step further judges whether the user who is logged in has the authority based on the authority information, and
the updating step updates the first billing destination only when the user has the authority.

10. The billing destination setting method of claim 7 further comprising:
a default setting step of storing a predetermined billing destination into the storage when the user logs in;
a holding step of holding the predetermined billing destination;
a recovery instruction storing step of storing a recovery instruction for updating the first billing destination to the predetermined billing destination, wherein
the receiving step receives the recovery instruction via the receiver from the user while the user is logged in, and
when the receiving step receives the recovery instruction after the first billing destination is updated, the updating step updates the second billing destination in the storage to the predetermined billing destination.

11. The billing destination setting method of claim 7 further comprising:
a designation receiving step of receiving designation of a plurality of printing target files that are to be acquired from an external device, wherein
the receiving step receives, via the receiver, a second billing destination for each of the printing target files, and
the updating step updates, for each printing target file, the first billing destination to one of the second billing destinations corresponding to the printing target file.

12. An image forming apparatus comprising:
an operation panel configured to receive an instruction for executing print processing from a logged-in user logged in during a first login session;
a storage storing therein a first billing destination to which a fee for execution of the print processing is charged;
a print processing execution part configured to execute the print processing corresponding to the instruction;
a receiver including a sub-operation panel different from the operation panel, and configured to receive an input of a second billing destination from the logged-in user logged in during the first login session;
a memory updater configured to, when the receiver receives the input of the second billing destination, perform update processing of updating the first billing destination to the second billing destination by storing the second billing destination into the storage; and
a billing part configured to charge, to the second billing destination stored in the storage, the fee for print processing.

13. The image forming apparatus of claim 12,
wherein the operation panel is configured to receive printing conditions for executing the print processing, and
wherein the receiver is configured to receive the second billing destination while the user is logged in and at a time after receiving the printing conditions and before receiving the instruction for executing print processing.

* * * * *